United States Patent
Teutoburg-Weiss et al.

(10) Patent No.: US 12,429,705 B2
(45) Date of Patent: Sep. 30, 2025

(54) ARRANGEMENT OF OPTICAL ELEMENTS AND METHOD FOR FORMING STRUCTURAL PATTERNS

(71) Applicants: SURFUNCTION GmbH, Saarbruecken (DE); DLIP UG, Saarlouis (DE)

(72) Inventors: Sascha Teutoburg-Weiss, Dresden (DE); Andrés F. Lasagni, Grumbach (DE)

(73) Assignees: Surfunction GmbH, Saarbruecken (DE); Dlip UG, Saarlouis (DE)

( * ) Notice: Subject to any disclaimer, the term of this patent is extended or adjusted under 35 U.S.C. 154(b) by 343 days.

(21) Appl. No.: 17/981,802

(22) Filed: Nov. 7, 2022

(65) Prior Publication Data
US 2023/0069848 A1 Mar. 9, 2023

Related U.S. Application Data

(63) Continuation of application No. PCT/EP2021/060065, filed on Apr. 19, 2021.

(30) Foreign Application Priority Data

May 8, 2020 (DE) ...................... 10 2020 205 849.0

(51) Int. Cl.
  *G02B 27/12* (2006.01)
  *G02B 5/04* (2006.01)
(52) U.S. Cl.
  CPC ............ *G02B 27/126* (2013.01); *G02B 5/04* (2013.01)
(58) Field of Classification Search
  CPC .............................. G02B 27/126; G02B 5/04
  (Continued)

(56) References Cited

U.S. PATENT DOCUMENTS 3,034,397 A * 5/1962 Saunders ................. G01B 9/02
356/510
4,336,978 A 6/1982 Suzuki
(Continued)

FOREIGN PATENT DOCUMENTS

CN 202948246 U 5/2013
CN 104368909 A 2/2015
(Continued)

OTHER PUBLICATIONS

Stephan Milles et al; "Fabrication of superhydrophobic and ice-repellant surfaces on pure aluminum using single and multiscaled periodic textures"; Scientific reports, Sep. 26, 2019.
(Continued)

*Primary Examiner* — William Choi
(74) *Attorney, Agent, or Firm* — Muncy, Geissler, Olds & Lowe, P.C

(57) ABSTRACT

An arrangement in which an angular prism is formed with two triangular part prisms which are connected to one another by a layer having properties splitting at least one laser beam into part beams. The two part prisms have two identical acute angles α. The laser beam is directed onto an outward-facing surface of one of the two part prisms. The at least one laser beam is split into two part beams by the reflection of a part of the radiation by the layer and transmission of a further part of the radiation through the layer. The part beams are each incident on an outward-facing surface, are reflected there and exit from the part prisms and are incident on at least one optical element and are aligned such that they interfere with one another in a region of a component in which a structural pattern is intended to be formed.

11 Claims, 2 Drawing Sheets

(58) Field of Classification Search
USPC .......................................................... 359/640
See application file for complete search history.

(56) References Cited

U.S. PATENT DOCUMENTS

| | | |
|---|---|---|
| 9,370,843 B2 | 6/2016 | Lasagni et al. |
| 9,764,424 B2 | 9/2017 | Roch et al. |
| 11,370,061 B2 | 6/2022 | El-Khoury et al. |

FOREIGN PATENT DOCUMENTS

| | | |
|---|---|---|
| DE | 595211 C | 4/1934 |
| DE | 2951207 A1 | 7/1980 |
| DE | 219581 A1 | 3/1985 |
| DE | 102011011734 B4 | 12/2014 |
| DE | 102011101585 B4 | 11/2015 |
| DE | 102017205889 A1 | 10/2018 |
| DE | 102018200036 B3 | 1/2019 |
| EP | 0505852 A2 * | 9/1992 |
| EP | 0843157 A2 | 5/1998 |
| EP | 2673106 A1 | 12/2013 |
| EP | 2976176 B1 | 10/2018 |
| WO | WO2017085618 A1 | 5/2017 |

OTHER PUBLICATIONS

DoroTEK; "Optische Komponenten & Lasermodulatoren"; retrieved on Apr. 9, 2024.

German Office Action dated Apr. 16, 2024 in corresponding application 10 2020 205 849.0—partial translation identifies relevant portion of cited document DoroTEK; "Optische Komponenten & Lasermodulatoren".

International Search Report dated Aug. 17, 2021 in corresponding application PCT/EP2021/060065.

* cited by examiner

ARRANGEMENT OF OPTICAL ELEMENTS AND METHOD FOR FORMING STRUCTURAL PATTERNS

This nonprovisional application is a continuation of International Application No. PCT/EP2021/060065, which was filed on Apr. 19, 2021, and which claims priority to German Patent Application No. 10 2020 205 849.0, which was filed in Germany on May 8, 2020, and which are both herein incorporated by reference.

BACKGROUND OF THE INVENTION

Field of the Invention

The present invention relates to an arrangement of optical elements and a method for forming structural patterns which can be formed into a compact, optical structure for generating periodic pronounced intensities of laser radiation for the structuring of surfaces. The method used to determine the form of the intensity distribution is laser interference structuring.

Description of the Background Art

Interference patterns have so far been obtained by the use of one or more beam splitter(s). The resulting part beams are deflected by reflective or refractive optical elements at different angles to the same area and superimposed there to form a structural pattern. This approach requires precise alignment of the reflective elements, taking into account corresponding path lengths of the part beams and sufficient space for construction.

Since the structural period $\wedge$ of the interference pattern depends on the enclosed angle $\theta$ of the part beams, a change in this always requires a new, laborious adjustment.

Another well-known possibility is to perform the beam splitting with the help of diffractive optical elements (DOEs). The part beams are deflected after the passage of a diffractive optical element with an angle dependent on the DOE and the laser wavelength. The wide beam paths of part beams of a split laser beam can be influenced once by means of two focusing optics. For this purpose, the beam splitting point is mapped on the DOE surface. A first lens with focus on the DOE parallelizes the part beams, which are then focused and superimposed in the direction of a component by a second focusing optics. Due to fixed focal lengths in optical lenses, at least one of the two focusing optics is replaced with a different focal length in order to change the structural period A.

On the other hand, a variable change in the structural period A can be achieved by parallelizing the part beams obtained by a DOE with a prism or an optical configuration of the same effect, as described in EP 2 976 176 B1, which corresponds to US 2016/0167165. The axial distance from the prism to the DOE determines the local impact of the part beams on the prism and thus the effective distance between them. A downstream optical lens focuses and superimposes the parallel incoming part beams, wherein the angle and the resulting period can be adjusted due to the fixed focal length by the distance between the part beams. For the exact parallelization of the part beams, the combination of DOE and prism with respect to the beam angle (DOE) and base angle (prism) are decisive for the corresponding wavelength. In addition, two precisely manufactured optical elements are required.

SUMMARY OF THE INVENTION

It is therefore an object of the present invention to provide an extremely compact design for direct laser interference structuring (DLIP), while retaining the flexibility of a changeable structural period, with a reduction in the required optical elements and the required construction volume.

According to an exemplary embodiment of the invention, a triangular or quadrangular prism can be formed with two triangular part prisms which are connected to each other on a planar plane via a layer having properties splitting at least one laser beam into part beams.

The two part prisms have two identical acute angles $\alpha$, which are each arranged between the planar plane at which the two part prisms are connected to each other and an outward-facing surface.

The at least one laser beam is directed onto one of the outward-facing surfaces of one of the two part prisms. In this case, the at least one laser beam should preferably be directed vertically to the outward-facing surface of one of the two part prisms in order to avoid reflection losses as far as possible.

The splitting of the laser beam into part beams takes place at the layer to which the two part prisms are connected, by the reflection of a part of the radiation by the layer and transmission of another part of the radiation by the layer. For this purpose, the at least one laser beam is incident on the layer.

The part beams thus obtained are then each incident on an outward-facing surface of one of the two part prisms. From there, the part beams reflected there are incident on at least one optical element which is formed such that the part beams are aligned, in particular focused in such a way, that they interfere with each other in a region of a component in which a structural pattern is intended to be formed. The function of the at least one optical element can also be the surface of the two individual prisms at which the part beams exit. Accordingly, the part beams obtained can also be influenced alone or in addition to the at least one optical element in that the angle of incidence of the at least one laser beam on the outward-facing surface of one of the two part prisms and the angles $\alpha$, $\beta$ and $\gamma$ of the two part prisms, taking into account the wavelength of the at least one laser beam and the optical refractive index of the two part prisms, are selected in such a way that the part beams are directed such that they interfere with each other in a region of a component in which a structural pattern is intended to be formed.

The acute angle $\alpha$ is arranged on the side of the two part prisms opposite the surface where the part beams exit the prism.

The at least one laser beam should be modified, preferably adapted in its polarization to the beam splitter layer, prior to being incident on one of the outward-facing surfaces of one of the two part prisms in order to achieve an equal distribution of energy into the part beams. In this case, the spatial intensity distribution of the laser beam directed onto the respective surface area of one of the two part prisms can be freely adapted. The at least one laser beam can, for example, be linearly shaped by means of a cylinder lens system or converted into a flat-top profile with suitable optical elements.

Starting from a mostly radially Gaussian-distributed laser beam energy distribution in the cross-sectional area of a laser beam, a linear beam cross-section can be selected as an example of a more uniform spatial intensity distribution. Linear polarization is not necessarily required. However, the polarization should match the respective beam splitter layer or be adapted in advance to the layer used for the beam splitting according to physical principles so that a comparable energetic ratio can be maintained for the part beams. For example, a linear polarization of the laser beam emitted by the respective beam source can be rotated into the correct spatial orientation or a change in linear polarization of the laser beam to circularly polarized laser radiation can be performed.

The two part prisms can each be formed in the same way. In this case, on the part prisms, two surfaces each can advantageously be directed toward each other at an angle α of 30° and two surfaces each at an angle β of 60°. As a result, the two interconnected two part prisms form an isosceles triangle in which the three surfaces each have the same length between the edges with the acute angles.

Advantageously, the impact position of the at least one laser beam on the surface of one of the two part prisms can be changed by a relative movement of the focal point of the laser beam on the outward-facing surface and the position of the prism, so that the distance DE of the position of impact to the tip of the two part prisms of the prism thus formed, and thereby the angle of incidence θ of the part beams in the region in which the part beams interfere with each other, can be changed. The at least one laser beam can be moved accordingly by a translational displacement. However, it should always be vertically incident on the corresponding surface to avoid radiation losses due to reflection.

The at least one laser beam can be directed onto the outward-facing surface by means of a suitable reflecting optical element.

Between the prism formed with the two part prisms and the at least one optical element, a further prism can be arranged, which is connected to two further prisms, which are integrally connected to each other by means of a layer, on which another laser beam is directed vertically to a surface of the further prism, and with the further prism, the further laser beam is transmitted and reflected in such a way that further part beams from this further prism are directed onto the at least one optical element. The further prism may be formed analogously to the prism already described above and can therefore also be used in such a way. The impact positions of the laser beams on the respective part prism of the second prism should have different distances DE.

As an alternative to this embodiment, a further prism can also be arranged offset with respect to the prism arranged upstream in the beam path of the part beams, so that the respective planes of the two prisms, which are spanned by the surface of the integral connection of the part prisms, are arranged parallel at a lateral distance from each other. The edges of the two prisms, which are arranged first at the part prisms in the beam path of the part beams, can thereby be aligned parallel to each other and be arranged in two different planes aligned parallel to each other.

In this way it can be achieved that the part beams exiting from the prism arranged in the beam path of the part beams upstream of the further prism is incident on an outward-facing surface at different entry point distances DE. This can also be supported by the part prisms of this prism being formed differently and in particular the surfaces by which the part beams exit from the part prisms can be aligned at different angles so that these part beams exit from these part prisms at different angles by optical refraction. Solely or in addition to this, the part beams emerging from the part prisms first arranged in the beam path of the part beams can also be incident on outward-facing surfaces of the further prism by means of reflective elements at different entry point distances DE.

It is also possible, however, to arrange another prism, which is connected to two further part prisms connected by means of a layer, between the prism formed by the two part prisms and which is aligned at an angle greater than 0°, preferably in the range of 30° to 120° with respect to the prism on which the at least one laser beam is incident first. The two part beams emerging from the prism can then be directed onto an outward-facing surface of the further prism by means of a reflective element, so that the two part beams can each be split into further part beams and can be used for the formation of a structural pattern. The relative rotation of the part beams with respect to the plane in which the layer is arranged between the two part prisms of the further prism can be performed as described by rotation of the prism or by a suitable additional optical element (e.g., Dove prism), which rotates the beams about a common axis.

The at least one optical element may be at least one focusing optical lens, at least one focusing reflective element or, at this position in the beam path of the part beams, a device which is configured for spatial modulation of the part beams.

In the beam path of the part beams, between the prism or the further prism, a Dove prism or another beam-splitting optical element which is formed for the achievement of interference of the part beams with higher order can be arranged. A Dove prism can rotate about an axis aligned parallel to the optical axis of the part beams in order to thus achieve a change in the orientation of structural elements forming a structural pattern. Since these are essentially periodically occurring structural elements which are formed by means of direct laser interference, different structural patterns can also be formed in that way which have the same or a differing structural period A.

As a material for the beam splitter layer, a metal and/or a dielectric material with suitable layer thickness can be used. Suitable coating materials are, for example, silver, aluminum, gold, chromium/chrome and combinations of thin layers with different optical refractive indexes, such as $SiO_2$, $TiO_2$, $Al_2O_3$, $Ta_2O_5$, $MgF_2$, $LaF_3$ and $AlF_3$. The integral symmetrical connection of the two part prisms can be achieved, for example, with optical pressure-sensitive adhesives based on acrylate resin or epoxy resin.

The layer or a layer system formed from several layers can be applied to the surface of one of the two part prisms by a vacuum coating process with suitable layer thickness. If the layer is formed with a metal or containing a metal, it can also be used as a solder layer for the integral connection of the two part prisms.

The at least one laser beam is split into two parallel part beams. The optical system is an equilateral prism, formed of two individual prisms which can be cemented together via a beam splitter layer. Such prisms are also referred to as "Koester prisms". The laser beam is directed at the prism by a laser beam source itself or by deflection in such a way that it is incident orthogonally on the prism side face. As a result, a purely transmitting behavior into the prism can be achieved and the single laser beam is split into two part beams at the beam splitter layer. Both part beams, which are reflected by side faces of the prisms, can be reflected in total reflection at the transition between two media and thus parallelized. Depending on the respective local impact position of the laser beam on the prism side face, the distance DS between the parallel part beams to each other can be influenced. With a downstream optical imaging system, such as a fixed focus lens, a lens system (spherical, aspherical, cylindrical, etc.) or a galvanometer scanner, the superimposition and focusing for the interference formation of the part beams can be influenced. For the adjustment of the beam distribution of the part beams in the energetic ratio 50:50 and thus to the contribution of the precise interference formation by both part beams, the polarization of the laser radiation can be aligned accordingly in advance by at least one polarizing optical element or an optical system.

The variable entry point distance DE of the impact position of the laser beam on the tip of the prism and the associated changes in the beam distance Ds of the part beams relative to each other and the closed beam angle θ enclosed between the part beams at constant focal length f and wavelength λ lead to an influence on the structural period ∧ of the structural pattern to be formed according to:

$$\text{Beam distance:} D_S = \frac{4D_E}{\sqrt{3}}$$

$$\text{Enclosed angle:} \Theta = 2\tan^{-1}\left(\frac{D_S}{2f}\right)$$

$$\text{Period:} \Lambda = \frac{\lambda}{2\sin(\Theta/2)}$$

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
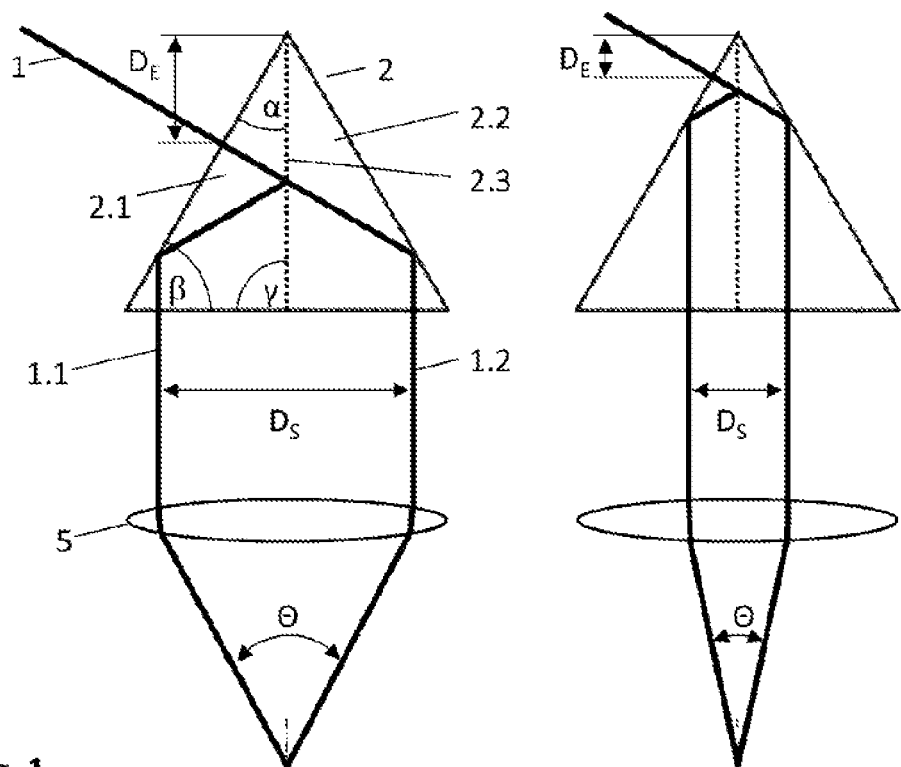
FIG. 1 is a schematic representation of an example of an inventive arrangement, wherein a laser beam is incident on a prism at different positions, which prism is split into two part beams.

In the arrangement shown in FIG. 1, a laser beam 1 is vertically incident on a surface of one of the two part prisms 2.1 and 2.2, which is enclosed by the two acute angles of the prism 2.1. The two part prisms 2.1 and 2.2 form a prism 2 by being integrally bonded to each other by means of the layer 2.3, in the example a dielectric coating and an acrylic resin adhesive.

In the prism 2 shown, all surfaces have the same length and are aligned at equal angles of 60° with respect to each other. Accordingly, the two part prisms 2.1 and 2.2 each have an angle γ of 90° at the surface where they are connected. The other two angles of the two equal triangular prisms 2.1 and 2.2 are 30° for the angle α and 60° for the angle β.

In a form not shown, the angles can also have other values, so that the angles β or γ can also be smaller or greater. The angles of the two part prisms 2.1 and 2.2 should be chosen taking into account the wavelength of the laser beam 1 and the optical refractive index of the two part prisms 2.1 and 2.2 in order to be able to form a structural pattern using the interference of the part beams.

As can be seen in FIG. 1, the laser beam 1 irradiated vertically into the prism 2 is incident on the layer 2.3 in the prism 2. A part of the laser radiation is reflected on the layer 2.3 and the other part of the laser radiation passes through the layer 2.3 due to transparency, so that the laser beam 1 is split into two part beams 1.1 and 1.2.

Both part beams 1.1 and 1.2 are incident on a surface of the prism 2, which are enclosed by an angle of 30° and an angle of 60° of one of the two part prisms 2.1 and 2.2 and reflected there in such a way that they are aligned parallel to each other and exit at a distance to each other from the prism 2. In this example, the part beams 1.1 and 1.2 are incident on a focusing optical lens, as an example of an optical element 5. By means of the focusing lens, they are deflected in the direction of an area in which the part beams 1.1 and 1.2 interfere with each other, so that they can form a corresponding structural pattern there.

By a relative movement of a component and the arrangement, large-scale structural patterns can be formed. Structural patterns do not necessarily have to be formed on a surface of a component. A structural pattern can also be formed below a surface of a component by modifying the component material.

FIG. 1 also shows how the structural period A of a structural pattern can be influenced in a very simple manner. The laser beam 1 is incident on the surface of one of the two part prisms 2.1 and 2.2 at different positions, so that the impact positions have different distances DE between the impact position and the tip of the prism 2 or the prism 2.1.

It can be seen that at a greater distance DE, the distance Ds of the part beams 1.1 and 1.2 and thus the angle of incidence θ is greater than it is at a shorter distance DE, as chosen in the right figure.

In the representation shown on the left in FIG. 1, the structural period A of the structural pattern thus formed is smaller than in a structural pattern as it can be formed according to the right representation.

In the embodiment shown in FIG. 2, the laser beam 1 is directed onto an outward-facing surface of one of the two part prisms 2.1 by means of a beam-deflecting element 3, which may be an element reflecting the laser beam 1 and linearly polarized by means of polarization optics 6 such that the part beams 1.1 and 1.2 later obtained each have the same energy before said laser beam is incident on the surface of the prism 2.1. The polarization optics 6 can be at least one waveplate, a polarizing filter, a reflective element or at least one polarizer, such as a wire grid, a polymer, a Glan-Thomson element, a Glan-Taylor element or a Brewster window.

Otherwise, the two part prisms 2.1 and 2.2 and thus the prism 2 are formed analogously to the one shown in FIG. 1.

For their modification, the part beams 1.1 and 1.2 emerging from the prism 2 are incident on at least one further optical element 4, which is arranged in the beam path of the part beams 1.1 and 1.2. This can cause a rotation of the part beams 1.1 and 1.2 about a common axis of rotation, which is possible with a Dove prism as element 4. Due to the rotation, the spatial orientation of the angle θ enclosed by the part beams can be changed when mapped by element 5, so that structural patterns with line-shaped parallel structural elements with different axial directions of the structural elements can be obtained.

However, an optical element 4 may also be another prism 2, which may be formed like the prism 2 previously described. In this case, different distances DE for the respective part beams escaping from the first prism should be adhered to for the prisms arranged downstream in the beam path.

Instead of a further prism 2, however, at least one other optical element 4 can be used, with which interferences of the part beams 1.1 and 1.2 of higher order can be achieved.

Figure 2:
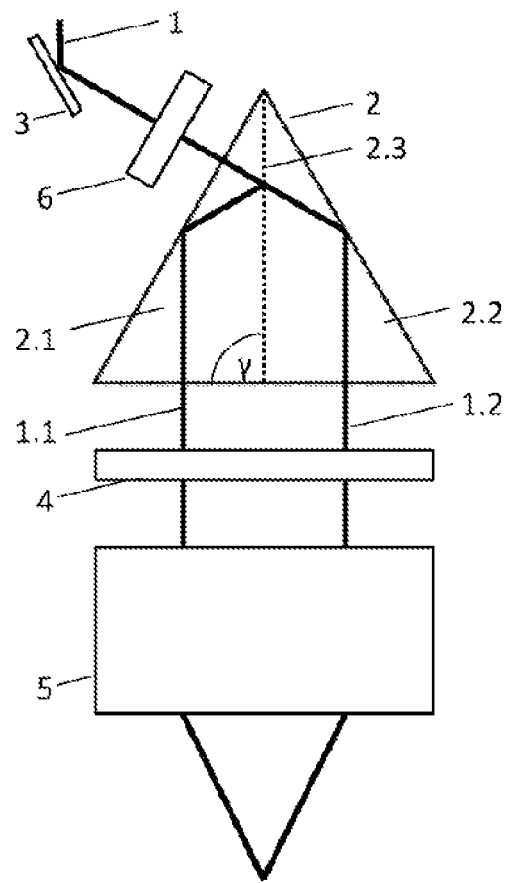
FIG. 2 is a schematic representation of a further example of an inventive arrangement.

In addition, in the example shown in FIG. 2, in the optical path of the part beams 1.1 and 1.2, at least one optical element 5 is arranged behind the element 4 with which the part beams 1.1 and 1.2 can be deflected such that they interfere with each other in a region in which a structural pattern is intended to be formed. This can be done with a focusing optical lens (aspherical, spherical, cylindrical), at least one Galvano scanner, focusing and reflecting optical elements or a device designed for spatial modulation of the part beams 1.2 and 2.2.

Figure 3:
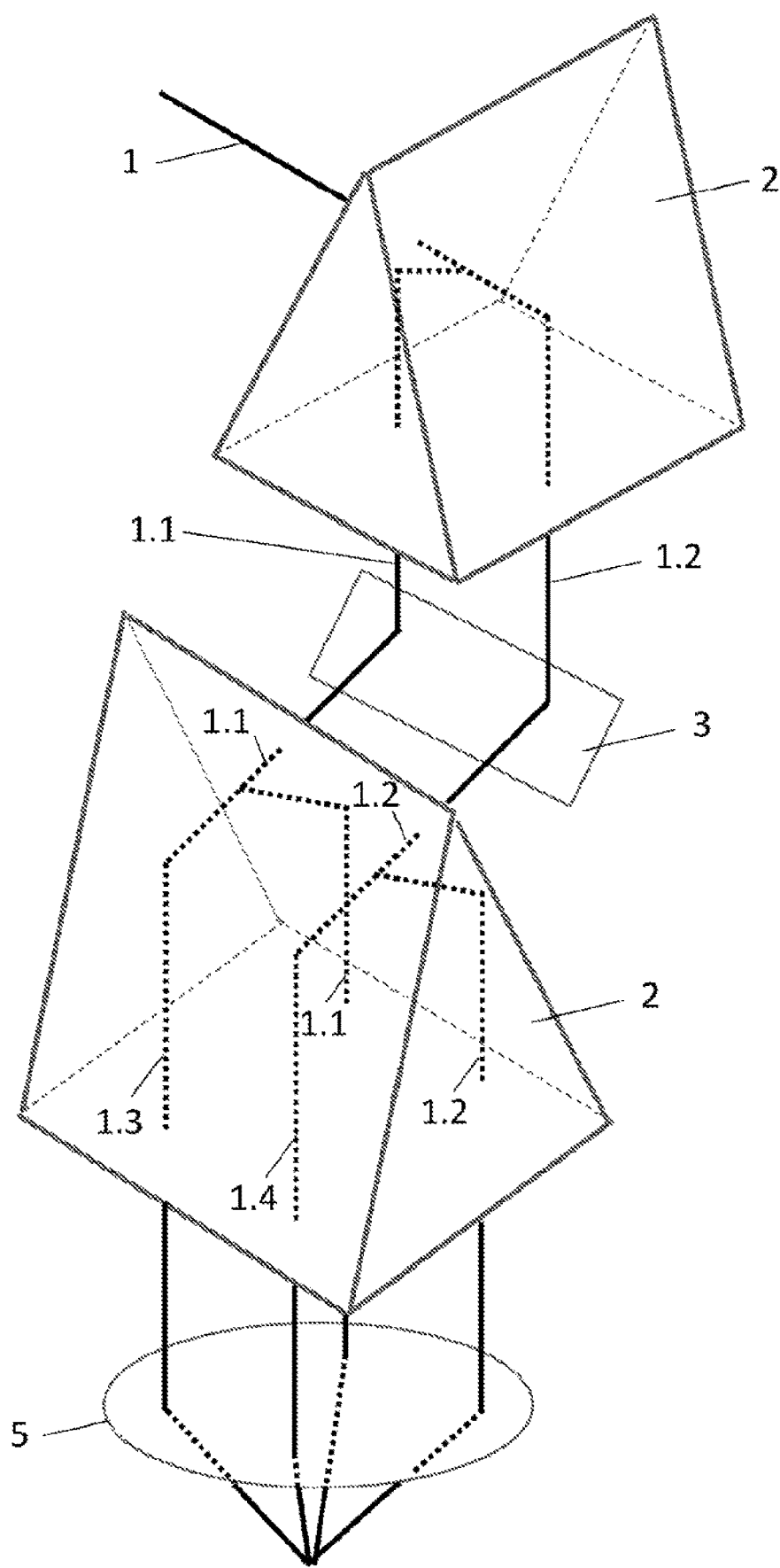
FIG. 3 is a schematic representation of another example with two prisms.

FIG. 3 shows an embodiment with two prisms 2 arranged successively between laser radiation source and structural pattern to be formed, each of which are also formed as "Koester prisms".

Here, too, a laser beam 1 is directed analogously to the examples described above on an outward-facing surface of one of the two part prisms 2.1 and then split by the layer 2.3 into two part beams 1.1 and 1.2. The escaping part beams 1.1 and 1.2 are directed onto an outward-facing surface of the further prism 2, preferably directed vertically to this surface, by means of a reflective optical element 3.

The further prism 2 also has a layer 2.3, which is designed for splitting the part beams. After analog reflection, four part beams 1.1 to 1.4 are now directed by an optical element 5 to form a structural pattern using the interference of the four part beams 1.1 to 1.4.

In this example, the two prisms 2 are aligned rotated at an angle of 90° to each other.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An arrangement of optical elements for the formation of structural patterns by means of direct laser interference, the arrangement comprising:
    a triangular or quadrangular prism with two triangular part prisms is formed, which prisms are connected to each other on a planar plane via a layer, the two triangular part prisms comprising properties that split at least one laser beam into part beams and the two triangular part prisms have two equal peak angles α that are each arranged between the planar plane at which the two triangular part prisms are connected to each other; and
    an outward-facing surface provided for each of the two triangular part prisms,
    wherein the at least one laser beam is directed onto one of the outward-facing surfaces of one of the two triangular part prisms so that the at least one laser beam is incident on the layer within the prism and there by reflection of a part of the radiation at the layer and transmission of a further part of the radiation by the layer, a split of the at least one laser beam into two part beams being carried out,
    wherein the part beams obtained are incident on one of the outward-facing surfaces of one of the two part prisms are reflected on these surfaces and the part beams emerge from the surfaces of the two part prisms arranged opposite the acute angle α, and from there, are incident on at least one optical element designed such that the part beams are aligned such that they interfere with each other in a region of a component in which a structural pattern is intended to be formed and/or the angle of incidence of the at least one laser beam to the outward-facing surface of one of the two part prisms and angles α, β and γ of the two part prisms, taking into account a wavelength of the at least one laser beam and the optical refractive index of the two part prisms, are selected such that the part beams are aligned such that they interfere with each other in a region of a component in which a structural pattern is intended to be formed, and wherein between the prism formed with the two part prisms and the at least one optical element, a further prism is arranged, which is connected to two further part prisms, which are interconnected by means of a layer, and another laser beam is directed vertically onto a surface of the further prism and transmitted and reflected with the further prism such that further part beams from this further prism are directed onto the at least one optical element.

2. The arrangement according to claim 1, wherein at least one laser beam is directed vertically onto the outward-facing surface of one of the two part prisms, which has been modified in its polarization or its spatial intensity distribution before impinging on one of the outward-facing surfaces of one of the two part prisms.

3. The arrangement according to claim 1, wherein the two part prisms are each designed in the same way.

4. The arrangement according to claim 1, wherein at the two part prisms in each case two surfaces at an angle of 30° and in each case two surfaces at an angle of 60° are aligned to each other.

5. The arrangement according to claim 1, wherein an impact position of the at least one laser beam on the outward-facing surface of one of the two part prisms is adapted to be changed so that a distance of the position of impact to the peak of the two part prisms and thus the angle of incidence θ of the part beams into the region in which the part beams interfere with each other are changeable.

6. The arrangement according to claim 1, wherein the at least one optical element is arranged as at least one focusing optical lens, at least one focusing reflective element or, at this position in the beam path of the part beams, as a device designed for spatial modulation of the part beams.

7. The arrangement according to claim 1, wherein the layer is formed of silver, aluminum, gold, chromium or as a combination of several thin layers formed on top of each other having different optical refractive indexes, where the combination of several thin layers is selected from the group consisting of $SiO_2$, $TiO_2$, $Al_2O_3$, $Ta_2O_5$, $MgF_2$, $LaF_3$ and $AlF_3$.

8. A method comprising:
    forming structural patterns by direct laser interference; and
    providing an arrangement according to claim 1.

9. The arrangement according to claim 1, wherein the layer is formed of silver, aluminum, gold, chromium or as a combination of several thin layers formed on top of each other having different optical refractive indexes.

10. An arrangement of optical elements for the formation of structural patterns by means of direct laser interference, the arrangement comprising:

a triangular or quadrangular prism with two triangular part prisms is formed, which prisms are connected to each other on a planar plane via a layer, the two triangular part prisms comprising properties that split at least one laser beam into part beams and the two triangular part prisms have two equal peak angles α that are each arranged between the planar plane at which the two triangular part prisms are connected to each other; and an outward-facing surface provided for each of the two triangular part prisms, wherein the at least one laser beam is directed onto one of the outward-facing surfaces of one of the two triangular part prisms so that the at least one laser beam is incident on the layer within the prism and there by reflection of a part of the radiation at the layer and transmission of a further part of the radiation by the layer, a split of the at least one laser beam into two part beams being carried out, wherein the part beams obtained are incident on one of the outward-facing surfaces of one of the two part prisms are reflected on these surfaces and the part beams emerge from the surfaces of the two part prisms arranged opposite the acute angle α and from there, are incident on at least one optical element designed such that the part beams are aligned such that they interfere with each other in a region of a component in which a structural pattern is intended to be formed and/or the angle of incidence of the at least one laser beam to the outward-facing surface of one of the two part prisms and angles α, β and γ of the two part prisms, taking into account a wavelength of the at least one laser beam and the optical refractive index of the two part prisms, are selected such that the part beams are aligned such that they interfere with each other in a region of a component in which a structural pattern is intended to be formed, and wherein between the prisms formed with the two part prisms and the at least one optical element, a further prism is arranged with two further part prisms connected to each other by means of a layer and is aligned at an angle greater than 0, with respect to the prism on which the at least one laser beam is first incident, or the part beams emerging from the prism are adapted to be rotated about a common axis and are directed directly or by means of a reflective element to an outward-facing surface of the further prism so that the two part beams is adapted to be split into further part beams and used to form a structural pattern.

11. An arrangement of optical elements for the formation of structural patterns by means of direct laser interference, the arrangement comprising:

a triangular or quadrangular prism with two triangular part prisms is formed, which prisms are connected to each other on a planar plane via a layer, the two triangular part prisms comprising properties that split at least one laser beam into part beams and the two triangular part prisms have two equal peak angles α that are each arranged between the planar plane at which the two triangular part prisms are connected to each other; and an outward-facing surface provided for each of the two triangular part prisms, wherein the at least one laser beam is directed onto one of the outward-facing surfaces of one of the two triangular part prisms so that the at least one laser beam is incident on the layer within the prism and there by reflection of a part of the radiation at the layer and transmission of a further part of the radiation by the layer, a split of the at least one laser beam into two part beams being carried out, wherein the part beams obtained are incident on one of the outward-facing surfaces of one of the two part prisms are reflected on these surfaces and the part beams emerge from the surfaces of the two part prisms arranged opposite the acute angle α, and from there, are incident on at least one optical element designed such that the part beams are aligned such that they interfere with each other in a region of a component in which a structural pattern is intended to be formed and/or the angle of incidence of the at least one laser beam to the outward-facing surface of one of the two part prisms and angles α, β and γ of the two part prisms, taking into account a wavelength of the at least one laser beam and the optical refractive index of the two part prisms, are selected such that the part beams are aligned such that they interfere with each other in a region of a component in which a structural pattern is intended to be formed, and wherein in the beam path of the part beams between the prism or a further prism, a Dove prism or another beam-splitting optical element formed for achieving interference of the part beams is arranged with a higher order.

\* \* \* \* \*